(12) United States Patent
McEldowney

(10) Patent No.: US 8,264,536 B2
(45) Date of Patent: Sep. 11, 2012

(54) DEPTH-SENSITIVE IMAGING VIA POLARIZATION-STATE MAPPING

(75) Inventor: Scott McEldowney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 12/547,419

(22) Filed: Aug. 25, 2009

(65) Prior Publication Data

US 2011/0050885 A1 Mar. 3, 2011

(51) Int. Cl.
*H04N 7/14* (2006.01)
(52) U.S. Cl. ........................................................ 348/135
(58) Field of Classification Search .................... 348/40, 348/42, 51, 54, 58, 59, 135
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |

(Continued)

FOREIGN PATENT DOCUMENTS

CN 201254344 B 6/2010

(Continued)

OTHER PUBLICATIONS

Rahmann, Stefan, "Polarization Images: A Geometric Interpretation for Shape Analysis", Retrieved at <<http://citeseerx.ist.psu.edu/viewdoc/download;jsessionid=4822BD0F87A053432CFECF6FD5E14A66?doi=10.1.1.16.2376&rep=rep1&type=pdf, In the 15th International Conference on Pattern Recognition (ICPR'00), vol. 3, Sep. 3-8, 2000, pp. 1-5.

(Continued)

*Primary Examiner* — Larry Donaghue
(74) *Attorney, Agent, or Firm* — Alleman Hall McCoy Russell & Tuttle LLP

(57) ABSTRACT

A depth-sensitive imager for imaging a scene in three dimensions. The depth-sensitive imager comprises a light source configured to project a polarized illumination onto a surface of the scene, and a detector configured to capture an image of the scene by detecting light from the scene, in which image a polarization state of the light is encoded. The detected light includes a portion of the polarized illumination reflected from the surface. The depth-sensitive imager further comprises an analyzer configured to generate output responsive to a distance between the light source and the surface based on the image.

20 Claims, 3 Drawing Sheets

U.S. PATENT DOCUMENTS

| | | |
|---|---|---|
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,115,128 A | 9/2000 | Vann |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,798,514 B2 * | 9/2004 | Daniels ............... 356/369 |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,737,975 B2 * | 6/2010 | Sato et al. ............... 345/426 |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2007/0222781 A1 | 9/2007 | Kondo et al. |
| 2007/0296958 A1 * | 12/2007 | Zou et al. ............... 356/73 |
| 2008/0026838 A1 | 1/2008 | Dunstan et al. |

| | | | |
|---|---|---|---|
| 2008/0212836 | A1 | 9/2008 | Fujimura et al. |
| 2009/0128833 | A1 | 5/2009 | Yahav |
| 2011/0013016 | A1* | 1/2011 | Tillotson ............... 348/135 |
| 2011/0317005 | A1* | 12/2011 | Atkinson ............... 348/135 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Rahmann, et al., "Reconstruction of Specular Surfaces using Polarization Imaging", Retrieved at <<http://www.google.co.in/url?sa=t&source=web&ct=res&cd=15&url=ftp%3A%2F%2Fftp.informatik.uni-freiburg.de%2Fpapers%2Flmb%2Fra_cant_cvpr01.ps.gz&ei=al8aSvqfOp7LjAfd7832DA&usg=AFQjCNG1_cHYQwnga5sAZplHqm1ePdYf1Q&sig2=3DwQvfyr7UY819tky9Ah9w>>, IEEE Computer Society Conference on Computer Vision and Pattern Recognition, vol. 1, Dec. 8-14.

Wolff, Lawrence B., "Scene Understanding from Propagation and Consistency of Polarization-based Constraints", Retrieved at <<http://ieeexplore.ieee.org/stamp/stamp.jsp?tp=&arnumber=323942&isnumber=7716>>, IEEE Computer Society Conference on Computer Vision and Pattern Recognition, Jun. 23-24, 1994, pp. 1000-1005.

"Polarization Imaging Camera", Retrieved at <<http://www.photonic-lattice.com/en/Pol_Camera0.html>>, May 26, 2009, p. 1.

"Polarized Scene Generator", Retrieved at <<http://www.polarissensor.com/Solutions/PolScene.htm>>, May 26, 2009, p. 1.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

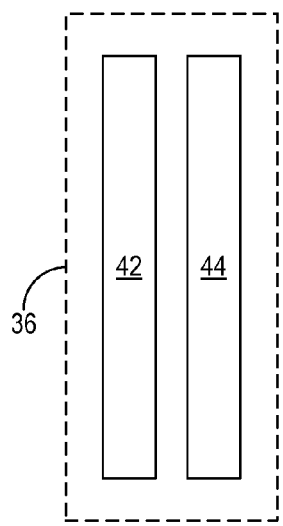
FIG. 3
FIG. 4
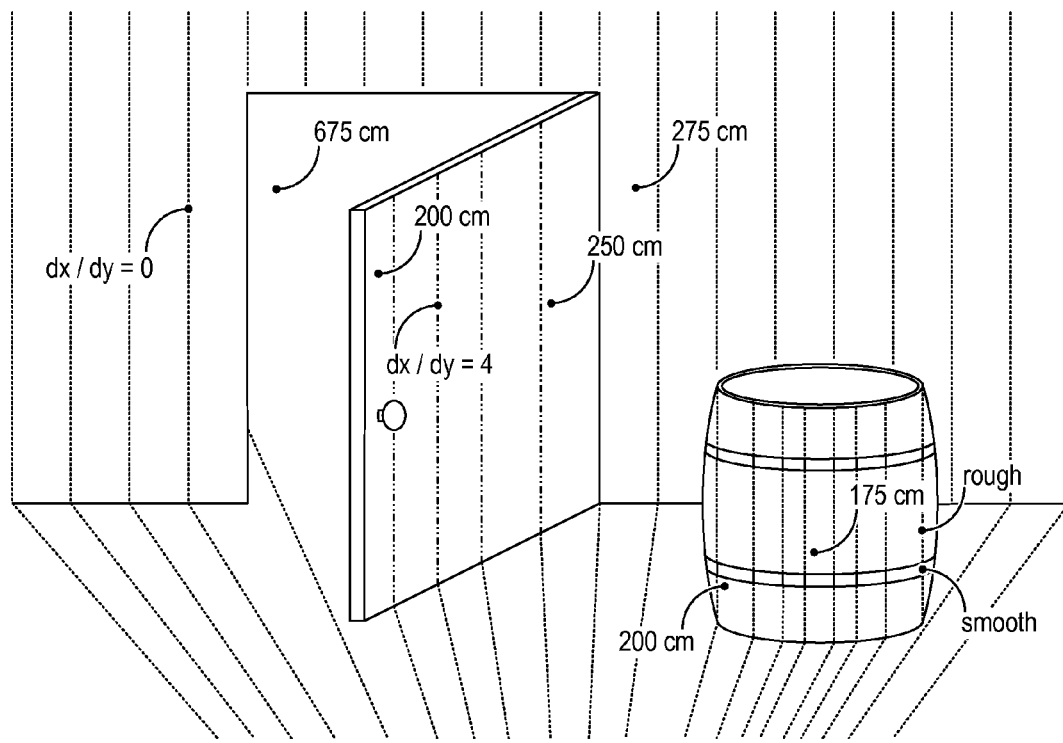
FIG. 5

_US 8,264,536 B2_

DEPTH-SENSITIVE IMAGING VIA POLARIZATION-STATE MAPPING

BACKGROUND

High-speed computing enables a wealth of sophisticated optical-imaging techniques. For instance, an image of a scene may be captured with the aid of a camera, and then processed to yield at least some three-dimensional information about the scene. Such techniques, referred to herein as 'depth-sensitive scene imaging' are used in fields as varied as video gaming and military ballistics.

Various depth-sensitive imaging techniques are known. Some involve capturing an image of a scene onto which a pulsed or structured illumination is projected. The depth of the objects and surfaces in the scene may be resolved by analyzing intensity information of the pulsed or structured illumination. With such techniques, however, adequate depth resolution may depend at least partly on being able to resolve the reflected illumination amid a background of ambient light.

SUMMARY

Therefore, one embodiment provides a depth-sensitive imager for imaging a scene in three dimensions, the scene comprising at least one surface. The depth-sensitive imager comprises a light source configured to project a polarized illumination onto the surface, and a detector configured to capture an image of the scene by detecting light from the scene. Accordingly, the detected light includes a portion of the polarized illumination reflected from the surface. A polarization state of the light is encoded in the image captured by the detector. The depth-sensitive imager further comprises an analyzer configured to generate output responsive to a distance between the light source and the surface based on the image. Inasmuch as the distance between the light source and the surface is a measure of the depth of the surface into the scene, the output provides three-dimensional, depth-sensitive information, which can be used in a wide range of applications. The information contained in the polarization state encoded in the reflected image can enable the detector to distinguish between light reflected from ambient light sources and light reflected from the illumination system.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIG. 3 shows a filter set in accordance with an embodiment of the present disclosure.

FIG. 4 shows a magnified view of a section of a polarization filter in accordance with an embodiment of the present disclosure.

FIG. 5 shows an image of the scene of FIG. 1 in accordance with an embodiment of the present disclosure.

DETAILED DESCRIPTION

The subject matter of the present disclosure is now described by way of example and with reference to certain illustrated embodiments. It will be noted that the drawings included in this disclosure are schematic. Views of the illustrated embodiments are generally not drawn to scale; aspect ratios, feature size, and numbers of features may be purposely distorted to make selected features or relationships easier to see.

Figure 1:
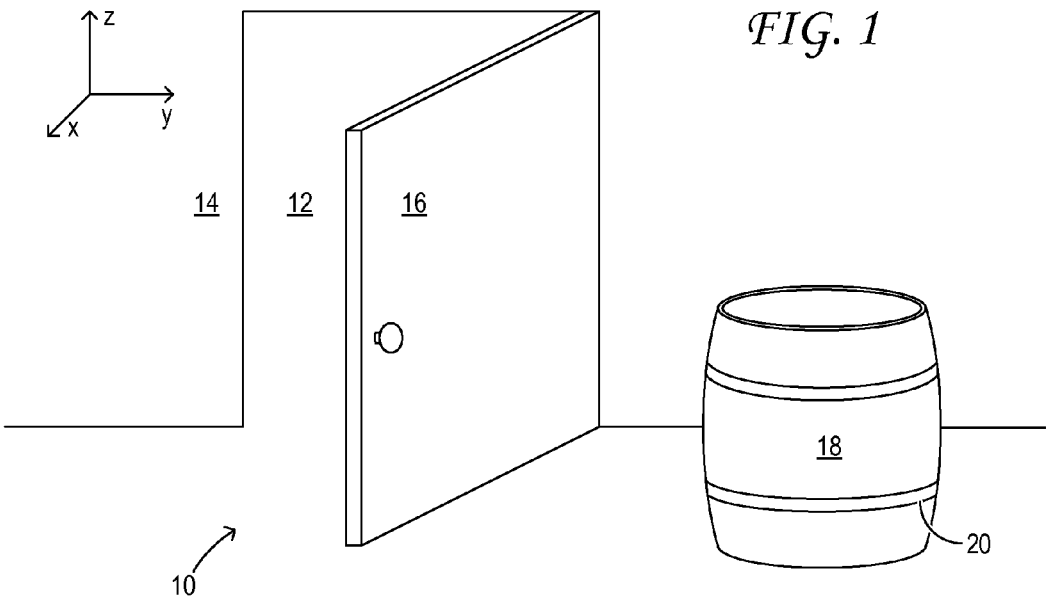
FIG. 1 shows a simplified, perspective view of an example scene that may be interrogated via polarization-state mapping in accordance with the present disclosure.

FIG. 1 shows a simplified, perspective view of an example scene 10 that may be interrogated via polarization-state mapping as described herein. The scene includes various objects and surfaces arranged at different depths, i.e., distances from the point of view of an observer located in front of the scene. Surface 12 is deepest in the scene (farthest from the point of view of an observer). Surface 14 is arranged forward of surface 12 (closer to the point of view of the observer), and surfaces 16, 18, and 20 are arranged forward of surface 14. Thus, the surfaces considered presently are macro surfaces, having dimensions of the same order of magnitude as the dimensions of the scene. It will be noted, however, that the systems and methods disclosed herein are not limited to such surfaces, but will also allow the examination of much smaller areas of a structured macro surface, e.g., the interrogation of rough or irregular topologies, etc.

In addition to being arranged at different depths within the scene, the various surfaces shown in FIG. 1 are oriented differently with respect to each other and the observer. Surfaces 12 and 14 are oriented normal to the observer's line of sight, while surface 16 is oblique to the observer's line of sight. Moreover, curved surfaces 18 and 20 present a continuous range of orientations relative to the observers's line of sight.

The surfaces shown in FIG. 1 may also present different textures. For instance, surface 20 may be relatively smooth compared to underlying surface 18. Optically, the different textures of the scene may exhibit different light-reflecting properties. For example, surface 20 may be largely specularly reflective, while surface 18 may be largely scattering.

Figure 2:
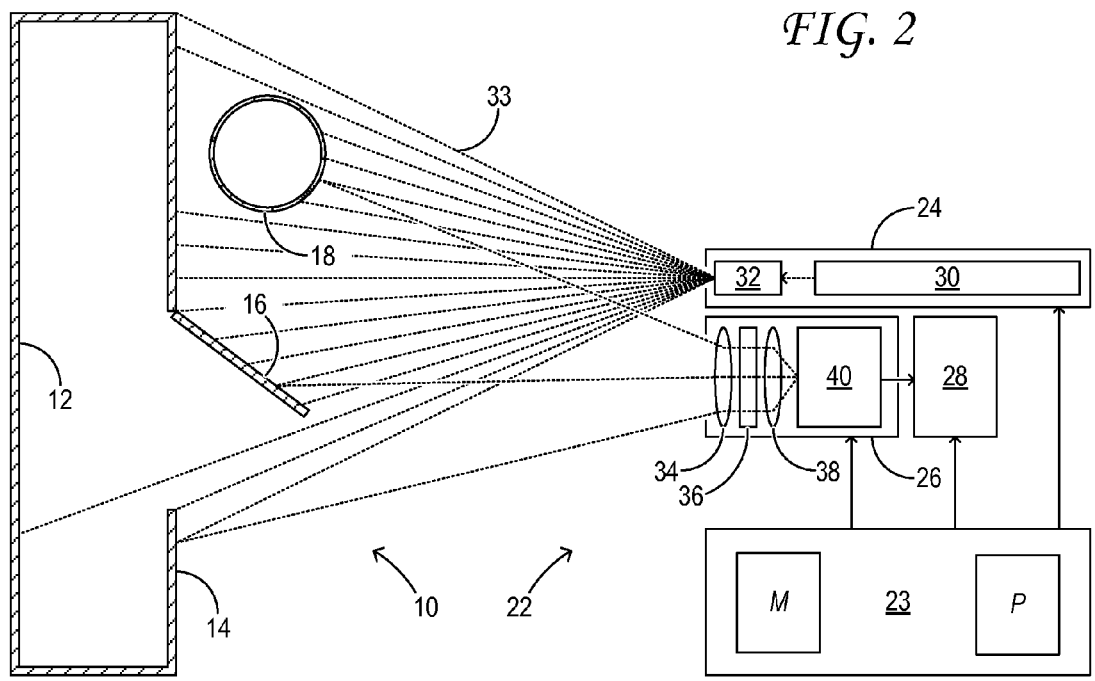
FIG. 2 shows a cross-sectional plan view of the example scene of FIG. 1 and a depth-sensitive imager in accordance with an embodiment of the present disclosure.

FIG. 2 shows a cross-sectional plan view of scene 10. The figure also shows depth-sensitive imager 22 in one example embodiment. The depth-sensitive imager is an optical system configured for imaging a scene in three dimensions; it comprises controller 23, light source 24, detector 26, and analyzer 28.

Controller 23 may be any control device configured to control light source 24, detector 26, and analyzer 28—e.g., to trigger, coordinate, and/or synchronize the functioning of these components. The controller schematically illustrated in FIG. 2 includes memory M and processor P, which is configured to write to and read from the memory. Although shown in the drawing as discrete boxes, the memory and the processor may be functionally distributed in any number of physical devices located anywhere, or they may be co-located in the same physical device. Moreover, the memory may include any combination of optical memory, magnetic memory, and semiconductor memory; it may include read-only memory as well as read-write memory. The memory may be configured to store various forms of data and to store logic instructions which enable at least the functionality described herein.

Accordingly, the processor may be configured to execute such logic instructions and thereby enact the described functionality. In some embodiments, the controller may be part of a general-purpose or application-specific computer system—a gaming console, a personal computer system, a targeting or tracking system, as examples. In some embodiments, the controller and the analyzer may be integrated parts of the same computer system, while in other embodiments, the analyzer may be a distinct, separate device having memory and a processor as described above. Further, one or both of the controller and the analyzer may be operatively coupled to various peripheral or integrated input and output devices—display systems, keyboards, pointing devices, etc.

Light source 24 may be any suitable light source configured to project a polarized illumination onto the various surfaces of scene 10. In the embodiment shown in FIG. 2, the light source comprises laser 30 and disperser 32. The laser provides a beam of intense, collimated, coherent, and substantially monochromatic light of a known polarization state.

The term 'polarization state' as used herein encompasses any non-trivial indication of the direction or sense of oscillation of light; the indication may be precise or approximate, complete or incomplete. One example of a complete polarization state is a full Stokes-vector representation comprising the components $S_0$, $S_1$, $S_2$ and $S_3$, which are defined as $$S_0 = |E_x|^2 + |E_y|^2$$

$$S_1 = |E_x|^2 - |E_y|^2$$

$$S_2 = |E_a|^2 - |E_b|^2$$

$$S_1 = |E_l|^2 - |E_r|^2,$$

where $E_1$ and $E_2$ are complex amplitude components of the electric field in a basis $(\hat{1}, \hat{2})$, $(\hat{x}, \hat{y})$ is the standard Cartesian basis, $(\hat{a}, \hat{b})$ is the Cartesian basis rotated 45°, and $(\hat{l}, \hat{r})$ is a circular basis defined so that $\hat{l} = (\hat{x} + i\hat{y})/\sqrt{2}$. Examples of an incomplete polarization state are the degree of polarization p, defined by $$p = \frac{\sqrt{S_1^2 + S_2^2 + S_3^2}}{S_0},$$

and the linear polarization orientation $\psi$, defined by $$2\psi = \arctan(S_2/S_1).$$

Continuing in FIG. 2, laser 30 may, in some embodiments, be a continuous-wave (CW) laser; in other embodiments, the laser may be pulsed, mode locked, Q-switched, etc. The power of the laser included in light source 24 may be chosen based on the scene to be imaged, with a more powerful laser being used for more distant and expansive scenes, and a less powerful laser being used for closer, more compact scenes. In addition to the power, the lasing wavelength of the laser may be chosen based on the scene to be imaged. In particular, the lasing wavelength may be chosen to overlap minimally with ambient light present in the scene—room light or natural light, for example. In one embodiment, the lasing wavelength may be a near-infrared wavelength.

Disperser 32 may be any device configured to disperse the collimated beam from laser 30 among a range of projection angles and thereby illuminate the scene with a plurality of polarized features spaced apart from each other. In the embodiment shown in FIG. 2, the polarized features form a patterned or otherwise structured illumination 33 of the known polarization state of laser 30. FIG. 2 shows the laser beam dispersed over a range of deflection angles confined to a horizontal plane. In the illustrated embodiment, the deflection angles assume discrete values separated by a constant increment, e.g., −20°, −15°, . . . , +20°. In other embodiments, the laser beam may be dispersed horizontally over a continuous range of deflection angles. It will be understood that the numerical ranges noted herein are examples only, and other ranges fall fully within the scope of this disclosure.

Disperser 32 may further disperse the laser beam over a range of deflection angles confined to a vertical plane. Like the horizontal dispersion described above, the vertical dispersion may be discrete or continuous. If horizontal and vertical dispersions are both discrete, then the scene will be illuminated by an array of polarized dots. If the vertical dispersion is discrete, but the horizontal dispersion is continuous, then the scene will be illuminated by a series of polarized horizontal stripes. And, if the horizontal dispersion is discrete, but the vertical dispersion is continuous, then the scene will be illuminated by a series of polarized vertical stripes, as further referenced below.

In order to disperse the laser beam, disperser 32 may comprise various optical components—lenses, mirrors, waveguides, masks, and the like. In some embodiments, the disperser may further comprise various active components—electromechanical actuators, choppers, piezoelectrics, and liquid-crystal light valves, for example.

Continuing in FIG. 2, detector 26 may be any device configured to capture an image of a scene by detecting light from the scene, in which image a polarization state of the light is encoded. Accordingly, the captured image may consist of a polarization-state map of the scene, in contrast to a more typical light-intensity map. Further, as shown in FIG. 2 the detector may be oriented so that the captured image includes at least part of the scene illuminated by light source 24. In this manner, a portion of the polarized illumination reflected from the various surfaces of the illuminated scene is detected by the detector.

That the captured image is polarization-based instead of intensity-based gives depth-sensitive imager 22 a significant advantage. Ambient light can effectively 'wash out' an illumination projected onto a scene. As a result, the light reflected from the scene may comprise a relatively large background of reflected, ambient light superposed on the desired signal, i.e., the reflection of the projected illumination. Such ambient light, by inference, is typically unpolarized. As such, even relatively bright ambient light can be virtually invisible in a polarization-based image. Therefore, in contrast to intensity mapping, polarization-state mapping offers an opportunity for improved signal-to-noise in configurations where the projected illumination is strongly polarized. In particular, the polarization state encoded and/or the Stokes vector may be used to improve the signal from the illumination source to the signal from the ambient light source.

As shown in FIG. 2, detector 26 includes collimating lens 34, filter set 36, focusing lens 38, and camera 40. For purposes of illustration, FIG. 2 shows three light rays reflecting from the surfaces of the illuminated scene. These light rays are collected by the collimating lens and directed through the filter set. On exiting the filter set, the light rays are focused onto the aperture of camera 40 via the focusing lens.

Camera 40 may be any camera sensitive to the polarized illumination of light source 24 and suitable for capturing an image of the scene; in embodiments where the light source comprises a near-infrared emitting laser, for example, the camera may be a near-infrared sensitive camera. Further, the camera may be a digital camera configured to represent the captured image as an array of pixels. As such, each pixel of the captured image may encode a polarization state of light reflected from a different region of the scene. Alternatively, the polarization state of the light reflected from a given region of the scene may be encoded in a plurality of pixels of the captured image, as further described below.

FIG. 3 schematically shows filter set 36 in one, example embodiment. The filter set includes wavelength-selective filter 42 and polarization filter 44. The wavelength-selective filter may be a low-pass, high-pass, or band-pass filter, for example. It may be virtually any dichroic or color filter configured to transmit light of one wavelength range while rejecting light of another wavelength range. The wavelengths transmitted by the wavelength-selective filter may be chosen to match the illumination wavelength of light source 24, e.g., the lasing wavelength of laser 30. Other embodiments fully consistent with this disclosure may include more than one wavelength-selective filter, or none at all.

Polarization filter 44 may be any optical filter configured to restrict the transmission of light based on the polarization state of the light. In one embodiment, the polarization filter may transmit light of a restricted range of polarization states, and reject light outside that range. The restricted range may correspond to a particular orientation of the polarization plane of the light with respect to a fixed frame of reference-vertically polarized, horizontally polarized, etc., or, the restricted range may correspond to left or right circular polarization of the light. Accordingly, the entire image captured by camera 40 may be formed from light of the same restricted range of polarization states. In other embodiments, however, the restricted range of polarization states may vary from one region of the captured image to another, as further described below, with reference to FIG. 4.

FIG. 4 schematically shows a magnified view of a section of polarization filter 44 in another example embodiment. Polarization filter 44 includes an array of windows through which light reflected from the scene is transmitted before being focused on camera 40. Thus, the light forming each region of the image is transmitted through a group of adjacent windows of the array. Each window is itself a polarization filter that transmits light of a restricted range of polarization states and rejects light outside that range. However, polarization filter 44 includes four different kinds of windows, each kind restricting the light it transmits to a different range of polarization states, e.g., to a unique polarization state, as further described below. Incorporating such a filter, the analyzer may be configured to determine some or all of the Stokes vectors of the light forming the image.

In FIG. 4, the four different kinds of windows are identified by the symbols A, B, C, and D. In one embodiment, window A may transmit light having a polarization plane aligned vertically, window B may transmit light having a polarization plane aligned 90 or 270° from vertical, window C may transmit light having a polarization plane aligned 45 or 135° from vertical, and window D may transmit right-circularly polarized light. It will be understood, however, that these designations are provided purely by way of example, and that other designations are fully embraced by this disclosure.

In the embodiment shown in FIG. 4, the four different kinds of windows are distributed over the surface of the polarization filter such that any 2×2 grouping of adjacent windows includes one window of each kind. Assuming that each window of polarization filter 44 maps to a corresponding light-detecting element of camera 40, each 2×2 grouping of adjacent elements will manifest detailed information about the polarization state of the light reflecting from a localized region of the scene. Accordingly, detector 26 may be configured to encode in the captured image the polarization state of the light reflected from numerous localized regions of the scene. In one embodiment, a complete polarization state map of the scene may be encoded, from which map a full Stokes-vector representation of the scene may be assembled via subsequent processing.

FIG. 4 illustrates a polarization filter configured to statically resolve up to four different polarization-state components. In other embodiments, however, a movable (e.g., rotating) polarization filter having a plurality of different windows may be used. The movable polarization filter may select a polarization-state that changes with time. Further, selection of the polarization state may be synchronized to acquisition of the image, so that a different, known polarization state is selected for successively acquired images. In such embodiments, a polarization-state map of the scene may be encoded in a short series of acquired images (e.g., four acquired images).

Returning now to FIG. 2, analyzer 28 may be any device configured to generate output responsive to a distance between light source 24 and one or more surfaces of scene 10 based on a polarization state encoded in an image. In doing so, the analyzer may extract some or all of the polarization-state information associated with various localized regions of the image. Further, the analyzer may, in some embodiments, reconstitute the polarization-state information in another form to facilitate further processing. Such other forms may contain polarization-state information as complete as the information originally encoded in the captured image. For example, the analyzer may compute a full Stokes-vector representation of the image and use it to generate the output. In other embodiments, however, such other forms may contain polarization-state information less complete than the information originally encoded in the captured image. For example, the analyzer may compute a degree-of-polarization or linear-polarization-orientation representation of the image and generate the output based on such a representation.

In some embodiments, analyzer 28 may time the arrival (i.e., the appearance) of a polarization state in a series of images captured by detector 26 and compute the distance based on the arrival time. In other words, the analyzer may be configured to generate the output based on a delay of the reflected portion of the polarized illumination arriving at the detector. In this embodiment, controller 23 may trigger laser 30 to deliver to scene 10 a short pulse of polarized illumination. The controller may synchronously (e.g., simultaneously) trigger the detector to begin capturing, in rapid succession, a series of images of the scene. The analyzer may then analyze the series of images to determine how long it takes the polarization state of the laser pulse to register in specific regions of the image. Regions where the polarization state registers promptly correspond to surfaces of the scene relatively close to light source 24; regions where the appearance of the polarization state is delayed correspond to surfaces farther from the light source. The analyzer may be configured to use such 'time of flight' data to generate output in which the various surfaces of the scene are associated with a corresponding depth.

In other embodiments, where the polarized illumination comprises a plurality of polarized features spaced apart from each other, the analyzer may be configured to generate the output based on where the polarized features appear in the image, as further described below with reference to FIG. 5.

FIG. 5 shows an image 46 of scene 10 in one, non-limiting embodiment. The illustrated image is one in which the scene is illuminated by a light source 24 that disperses polarized illumination continuously in the vertical direction and discretely in the horizontal direction. Accordingly, the scene is illuminated by a series of vertical stripes having a fixed polarization state, a portion of this illumination appearing in the image. Because of the indicated dispersion geometry, adjacent vertical lines illuminating nearer surfaces of the scene (closer to light source 24) are closer together, and adjacent vertical lines illuminating surfaces deeper into the scene (farther from the light source) are spread farther apart. This observation may be generalized based on the principles of Euclidean geometry to yield a quantitative triangulation method for obtaining depth information. In particular, triangulation may be applied to obtain depth information for any region of a surface where two or more of the vertical stripes are resolved in the image. In one embodiment, input parameters for the triangulation method include a spacing between adjacent polarized features and an angle between adjacent polarized features. It will be understood, however, that other embodiments are contemplated which do not rely particularly on the ability to resolve adjacent polarized features at all times. Triangulation is equally applicable to embodiments where the polarized illumination is dispersed in other configurations, e.g., dots, horizontal stripes, etc. Thus, analyzer 28 may be configured to geometrically analyze the captured image and thereby generate output in which the various surfaces of the scene are associated with a corresponding depth. For purposes of illustration, one example result is shown by the distance markers in FIG. 5.

In each of the embodiments described above, analyzer 28 is configured to sense depth by identifying regions of a captured image where the encoded polarization state substantially matches the originally projected polarized illumination 33 provided by light source 24. However, other embodiments are contemplated in which the analyzer identifies regions of the image where the polarization state has changed relative to the polarized illumination of the light source. In such embodiments, the analyzer may generate output further responsive to a condition of the surface. Accordingly, the analyzer may be configured to assess the condition by comparing the polarization state encoded in the image to a polarization state of the originally projected polarized illumination.

In one such embodiment, analyzer 28 is configured to assess an orientation of one or more surfaces of a scene. When light is incident on a surface and is at an oblique angle reflects off a surface with some amount of specular reflection the electric-field vector oscillating parallel (S polarized) to the surface will be reflected differently than the electric-field vector oscillating perpendicular (P polarized) to the surface. This action causes the polarization state of the light reflected from the surface to differ from that of the incident light in a predictable way, based on the orientation of the surface. Therefore, by knowing the polarization state of the polarized illumination from light source 24, and by measuring the polarization state of the reflected portion of the polarized illumination encoded in the image, the analyzer may compute the orientation of the surface based on the principle identified above. Accordingly, the output generated by the analyzer may indicate the orientation of one or more surfaces of the scene, as shown by the slope markers in FIG. 5.

In another embodiment, analyzer 28 may be configured to assess a texture of one or more surfaces of a scene. For example, when plane polarized light reflects off a rough surface, numerous reflections occurring at the randomly oriented microsurfaces of the rough surface may partially or completely randomize the polarization state of the light, based on the same principle noted above. Thus, by knowing the polarization state of the polarized illumination provided by light source 24 and by measuring the polarization state of the reflected portion of the polarized illumination encoded in the image, the analyzer may assess how rough the surface is. Accordingly, the output generated by the analyzer may indicate a roughness of various surfaces of the scene, as shown by the roughness labels in FIG. 5.

The configurations described herein enable various methods for imaging a scene in three dimensions. Accordingly, some such methods are now illustrated, by way of example, with continued reference to the above configurations. It will be understood, however, that the following methods, and others fully within the scope of this disclosure, may be enabled via other configurations as well.

Figure 6:
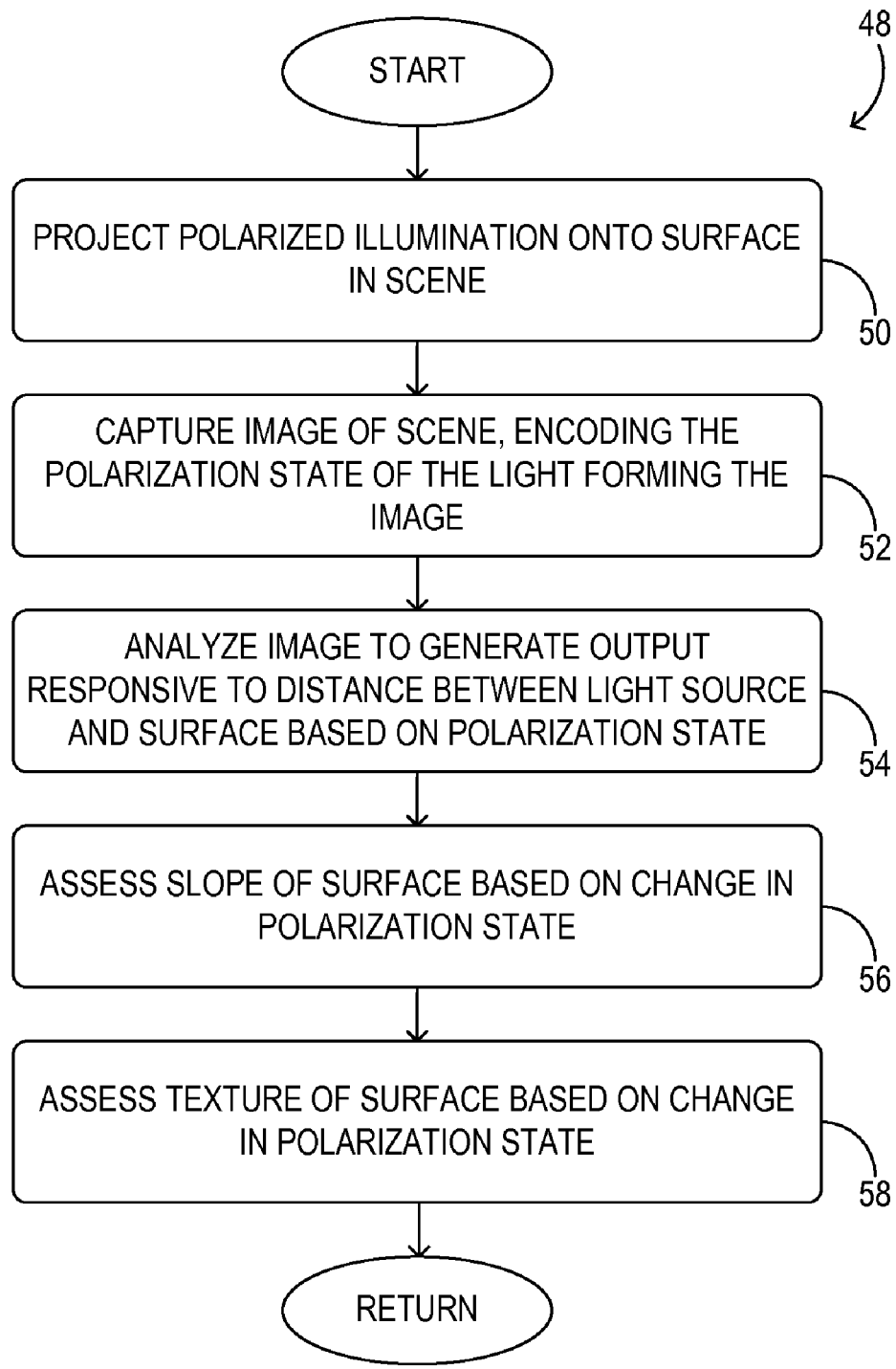
FIG. 6 illustrates an example method for imaging a scene in three dimensions in accordance with an embodiment of the present disclosure.

FIG. 6 illustrates an example method 48 for imaging a scene in three dimensions, the scene comprising one or more surfaces.

Method 48 begins at 50, where a polarized illumination is projected onto the one or more surfaces of the scene. The polarized illumination may be projected by a light source comprising a laser (e.g., light source 24). Further, the polarized illumination may be continuous or pulse modulated. In some embodiments, the polarized illumination may comprise a plurality of features spaced apart from each other.

Method 48 then advances to 52, where an image of the scene is captured by detecting light from the scene, the light including a portion of the polarized illumination reflected from the one or more surfaces of the scene. In the captured image, a polarization state of the light is encoded. In one embodiment, the polarization state may be so complete that a full Stokes-vector representation of the scene may be assembled via subsequent processing. In other embodiments, the polarization state may include less information. The image may be captured by a detector comprising a filter bank and a camera (e.g., detector 26), as described herein.

Method 48 then advances to 54, where the image is analyzed to generate output responsive to a distance between the light source and the surface based on the image. In one embodiment, the analysis may comprise computing a full Stokes-vector representation of one or more regions of the image, and generating an output based on the full Stokes-vector representation. In other embodiments, the output may be based on a less complete description of the polarization state of the one or more regions-a degree of polarization or linear polarization orientation, for example. In some embodiments, the polarization state may be determined for each pixel of the image. In other embodiments, however, the polarization state may be determined for regions of the image comprising a plurality of adjacent pixels.

In embodiments where the polarized illumination comprises a plurality of polarized features spaced apart from each other, the output may be further based on where the polarized features appear in the image. In other embodiments, where the polarized illumination and the detector are pulse modulated, the output may be based on a delay of the portion of the polarized illumination arriving at the detector.

Continuing in FIG. 6, method 48 advances to 56, where a slope of the surface is assessed by comparing the polarization state encoded in the image to a polarization state of the polarized illumination. The method then advances to 58, where a texture of the surface is assessed by comparing the polarization state encoded in the image to a polarization state of the polarized illumination.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A depth-sensitive imager for imaging a scene in three dimensions, the scene comprising a surface, the depth-sensitive imager comprising:
    a light source configured to project a polarized illumination onto the surface;
    a detector configured to capture an image of the scene by detecting light from the scene, in which image a polarization state of the light is encoded, the light including a portion of the polarized illumination reflected from the surface; and
    an analyzer configured to generate output responsive to a distance between the light source and the surface based on the image.

2. The depth-sensitive imager of claim 1, where the surface is one of a plurality of surfaces within the scene arranged at a corresponding plurality of distances from the light source, and where the output is further responsive to the plurality of distances based on the image.

3. The depth-sensitive imager of claim 1, where the light source is configured to project the polarized illumination with a plurality of polarized features spaced apart from each other, and the analyzer is configured to generate the output based on where the polarized features appear in the image.

4. The depth-sensitive imager of claim 1, where the light source is pulse-modulated, the detector is synchronized to the light source, and the analyzer is configured to generate the output based on a delay of the portion of the polarized illumination arriving at the detector.

5. The depth-sensitive imager of claim 1, where the polarization state is sufficient to enable a full Stokes vector representation of the image to be assembled.

6. The depth-sensitive imager of claim 1, where the analyzer is configured to generate the output based on a degree of polarization determined for each of a plurality of regions of the image.

7. The depth-sensitive imager of claim 1, where the analyzer is configured to generate the output based on a linear polarization orientation determined for each of a plurality of regions of the image.

8. The depth-sensitive imager of claim 1, where the output is generated responsive to a condition of the surface, and the analyzer is further configured to assess the condition by comparing the polarization state encoded in the image to a polarization state of the polarized illumination.

9. The depth-sensitive imager of claim 8, where the condition comprises a texture of the surface.

10. The depth-sensitive imager of claim 8, where the condition comprises an orientation of the surface.

11. The depth-sensitive imager of claim 1, where the light source comprises a laser.

12. The depth-sensitive imager of claim 1, where the detector comprises a polarization filter through which the light is transmitted before being detected.

13. The depth-sensitive imager of claim 1, where the detector comprises an array of windows through which the light is transmitted before being detected, where light forming each region of the image is transmitted through a group of adjacent windows of the array, and each window in the group of adjacent windows transmits light of a unique polarization state.

14. A method for imaging a scene in three dimensions, the scene comprising a surface, the method comprising:
    projecting a polarized illumination onto the surface;
    capturing an image of the scene by detecting light from the scene, in which image a polarization state of the light is encoded, the light including a portion of the polarized illumination reflected from the surface; and
    analyzing the image to generate output responsive to a distance between the light source and the surface based on the image.

15. The method of claim 14, further comprising computing a full Stokes vector representation of the image.

16. The method of claim 14, where the output is generated based on a degree of polarization determined for each region of the image.

17. The method of claim 14, where the output is generated further based on a linear polarization orientation determined for each region of the image.

18. The method of claim 14, where the output is generated responsive to a texture or orientation of the surface, and the analyzer is further configured to assess the texture or orientation by comparing the polarization state encoded in the image to a polarization state of the polarized illumination.

19. A depth-sensitive imager for imaging a scene in three dimensions, the scene comprising a surface, the depth-sensitive imager comprising:
    a laser configured to project onto the surface a polarized illumination comprising a plurality of polarized features spaced apart from each other;
    a camera configured to capture an image of the scene by detecting light from the scene, in which image a degree of polarization of the light is encoded, the light including a portion of the polarized illumination reflected from the surface; and
    an analyzer configured to triangulate a distance between the laser and the surface based on a spacing between adjacent polarized features in the image and further based on an angle between the adjacent polarized features in the polarized illumination.

20. The depth-sensitive imager of claim 19, where the laser is configured to emit at a near-infrared wavelength, and the camera is configured to detect light of the near-infrared wavelength.

* * * * *